United States Patent
Nitta

(10) Patent No.: US 7,055,061 B2
(45) Date of Patent: May 30, 2006

(54) NORMAL AND STANDBY MODES FOR DUPLICATED FIELD APPARATUS CONTROL SYSTEM

(75) Inventor: Yoshiyuki Nitta, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 572 days.

(21) Appl. No.: 09/837,460

(22) Filed: Apr. 19, 2001

(65) Prior Publication Data

US 2001/0056304 A1 Dec. 27, 2001

(30) Foreign Application Priority Data

Apr. 19, 2000 (JP) ............................ P2000-118413

(51) Int. Cl.
*G06F 11/00* (2006.01)
(52) U.S. Cl. ............................................ 714/13; 714/9
(58) Field of Classification Search .................... 714/9, 714/10, 13, 43; 700/82, 21; 370/220
See application file for complete search history.

(56) References Cited

U.S. PATENT DOCUMENTS 5,473,599 A * 12/1995 Li et al. ...................... 370/219
5,790,775 A * 8/1998 Marks et al. .................... 714/9
5,909,427 A * 6/1999 Manning et al. ............. 370/219
5,922,077 A * 7/1999 Espy et al. ...................... 714/7
5,928,367 A * 7/1999 Nelson et al. ................... 714/6
5,975,738 A * 11/1999 DeKoning et al. ............. 700/79
6,473,396 B1 * 10/2002 Kumar ........................ 370/220
6,513,554 B1 * 2/2003 Hellstrom et al. .......... 139/1 R
6,571,355 B1 * 5/2003 Linnell ........................... 714/9

FOREIGN PATENT DOCUMENTS

JP           5-76077         3/1993

* cited by examiner

*Primary Examiner*—Robert Beausoliel
*Assistant Examiner*—Gabriel L. Chu
(74) *Attorney, Agent, or Firm*—Oblon, Spivak, McClelland, Maier & Neustadt, P.C.

(57) ABSTRACT

In a field apparatus control system, one of duplicated main control units and one of communication control units constitute a normal system, and the other of the duplicated main control units and other of the communication control units constitute a standby system. Each of the normal system of communication control unit and the standby system of communication control unit has a same address on a network via the field bus, which is allocated to each of the normal and standby systems of communication control systems. The information that is outputted to the address from the field apparatus via the field bus is transmitted to the normal and standby systems of communication control units, respectively.

10 Claims, 10 Drawing Sheets

NORMAL AND STANDBY MODES FOR DUPLICATED FIELD APPARATUS CONTROL SYSTEM

BACKGROUND OF THE INVENTION

1. Field of the Invention

The present invention relates to a field apparatus control system for controlling the field apparatus of various plants, such as a power plant, and a storage medium which a computer can read.

2. Description of the Prior Art

As shown in FIG. 10, a field apparatus control system 50 for controlling a field apparatus has a field apparatus control system main body 51 for controlling a plurality of field apparatuses 53, which are slaves for controlling a plant apparatus, connected to a field bus 52.

The field apparatus control system main body 51 comprises a field bus communication control unit (master) 54 for performing information (data) communication processing between a plurality of field apparatuses 53 and the local field apparatus control system main body 51 via the field bus 52, a main control unit 55 having a CPU for controlling the field apparatuses 53 and a memory for storing a data program, and a driver 54 which is incorporated into the main control unit 55 (memory thereof) for controlling data input/output processing between the field bus communication control unit 54 and the main control unit 55.

This memory includes a storage medium, such as a floppy disk, magneto-optical disk CD-R (Compact Disk-Recordable), CD-R/W (Compact Disk Rewritable), DVD (Digital Versatile Disk), and IC memory, and the main control unit 55 has a drive unit, according to the type of the storage medium, as a memory, so that a data program can be read/written from/to the memory.

One field bus communication control unit 54, which is a master, is set for a plurality of slaves (field apparatuses) 53. The data transmission path of the field bus 52 is structured as a single transmission path, as shown in FIG. 10.

In other words, the main control unit 55 performs, by operations based on the driver 56, processing for inputting the apparatus status information (status information) transmitted from the field apparatuses 53 side to the local main control unit 55 via the field bus communication control unit 54, and processing for outputting the information, such as a control instruction, to the field apparatuses 53 via the field bus communication control unit 54.

However, according to a conventional field apparatus control system, if the field bus communication control unit 54 or a field bus (transmission path) 52 fails, data input/output operations between the field apparatus 53 and the main control unit 55 stop, thereby reducing the reliability of the field control unit.

SUMMARY OF THE INVENTION

The present invention is directed to overcome the foregoing problems.

Accordingly, it is an object of the present invention to provide a field apparatus control system and computer-readable storage medium which are configured to have a duplication of at least one communication control unit and field bus using a general purpose field bus without adding original protocol, so as to improve the reliability of the field apparatus control system To achieve such object, according to one aspect of the present invention, there is provided a field apparatus control system for controlling a field apparatus connected to a field bus, comprising: duplicated main control units for controlling the field apparatus; and duplicated communication control units for processing information communication between the main control units and the field apparatus via the field bus, respectively, wherein one of the duplicated main control units and one of the communication control units constitute a normal system, and other of the duplicated main control units and other of the communication control units constitute a standby system and each of the normal system of communication control unit and the standby system of communication control unit have a same address on a network via the field bus, which is allocated to each of the normal and standby systems of communication control systems, and wherein information that is outputted to the address from the field apparatus via the field bus is transmitted to the normal and standby systems of communication control units, respectively.

In a preferred embodiment of this aspect, each of said normal and standby systems of communication control units further comprises: operation request transmission means, when the communication control unit is the normal system, for transmitting an operation request to the field apparatus based on control information, said control information being transmitted from the main control unit of the system; means for receiving response information corresponding to the operation request transmitted from the field apparatus to the address so as to transmit the received response information to the main control unit of the system; means for judging whether or not failure occurs to the system; means for stopping operation of the communication control unit, when the judgment means judges that failure occurs to the system and the communication control unit is the normal system; means that, when the communication control unit is the standby system, monitors the operation of the other communication control unit, which is the normal system, and, when, by the monitored result, detecting the stop of the operation of the other communication control unit, switches the communication control unit, which is the standby system, to the normal system.

According to this aspect of the present invention described above, the communication control unit is duplicated, and same address are allocated to each of the communication control units so that, even if one unit fails information communication processing between the corresponding main control unit and the field apparatus via the field bus can be constituted using the other unit.

This aspect of the present invention has an arrangement that said field bus connected to the field apparatus is duplicated, and each of said communication control units further comprises: operation request transmission means, when the communication control unit is the normal system, for transmitting an operation request to the field apparatus via each of the duplicated field buses based on control information, said control information being transmitted from the main control unit of the system; first judgment means for judging whether or not response information corresponding to the operation request is transmitted from the field apparatus via one of the duplicated field buses; means for receiving the transmitted response information, when the first judgment means judges that the response information is transmitted, so as to transmit the received response information to the main control unit of the system; second judgment means for judging whether or not response information corresponding to the operation request is transmitted from the field apparatus to the address via the other one of the duplicated field buses when the first judgment means judges that the response information is not transmitted; means for receiving the transmitted response information when the second judgment means judges that the response information is transmitted so as to transmit the received response information to the main control unit of the system; means for transmitting information to indicate the generation of failure in the duplicated field buses to the main control unit of the system when the second judgment means judges that the response information is not transmitted; failure judgment means for judging whether or not failure occurs to the system; means for stopping operation of the communication control unit, when the communication control unit is the normal system and the failure judgment means judges that failure occurs to the local system; and means, when the communication control unit is the standby system, that monitors the operation of the other communication control unit, which is the normal system, and, when, by the monitored result, detecting the stop of the operation of the other communication, switches the communication control unit, which is the standby system, to the normal system.

According to this aspect of the invention, the communication control unit is duplicated and the field bus is also duplicated, so that even if one unit fails, the information communication processing between the corresponding main control unit and the field apparatus via the field bus can be continued using the other unit, and even if one field bus fails, the information communication processing between the information communication unit and the field apparatus via the field bus can be continued using the other field bus, making it possible to improve the reliability of the field apparatus control system.

To achieve such object, according to another aspect of the present invention, there is provided a field apparatus control system for controlling duplicated field apparatuses constituting normal and standby systems of field apparatuses, comprising: duplicated field buses connected to the duplicated field apparatuses, respectively, said one of duplicated field buses being referred as a normal system field bus and other thereof being referred as a standby system field bus; duplicated main control units for controlling the duplicated field apparatuses; and duplicated communication control units for processing information communication between the main control units and the duplicated field apparatuses via the duplicated field buses, respectively, wherein one of the duplicated main control units and one of the communication control units constitute a normal system, and the other of the duplicated main control units and other of the communication control units constitute a standby system, and the normal system of communication control unit is connected via the normal system field bus to the normal system field apparatus so that the normal system of communication control unit executes information communication processing between the main control unit of the standby system and the normal system field apparatus via the normal system field bus, and wherein the standby system of communication control unit is connected via the standby system field bus to the standby system field apparatus so that the standby system of communication control unit executes information communication processing between the main control unit of the normal system and the standby system field apparatus via the standby system field bus.

In preferred embodiment of this another aspect, wherein said normal system of communication control unit further comprises: operation request transmission means for transmitting an operation request to the normal system field apparatus via the normal system field bus based on the normal system field apparatus control information which is transmitted from the main control unit of the system; means for receiving response information corresponding to the operation request which transmitted from the normal system field apparatus via the normal system field bus so as to transmit the received response information to the main control unit of the system; failure judgment means for judging whether or not failure occurs to the system; and means for stopping operation of the communication control unit when the failure judgment means judges that failure occurs to the system, and wherein said standby system of communication control unit comprises means for monitoring operation of the other communication control unit which is the normal system so as to switch the communication control unit which is the standby system to the normal system when detecting the stop of the operation of the other communication control unit according to the monitored result.

According to the another aspect of the present invention, the field apparatus and the field bus are duplicated, and the duplicated field apparatuses, field buses and the duplicated communication control units are connected such that communication is possible so as to construct different networks from each other, so that duplication is possible without changing the configuration of the field apparatuses.

Therefore, even if one of the duplicated field apparatuses fails, the information communication to other of the duplicated field apparatuses can be continued through the field bus connected to other of the duplicated field apparatuses, making it possible to improve the reliability of the field apparatus control system.

To achieve such object, according to further aspect of the present invention, there is provided a field apparatus control system for controlling a field apparatus, comprising: duplicated first and second field buses connected to said field apparatus; a main control unit for controlling said field apparatus; and a communication control unit for processing information communication between the main control unit and the field apparatus via the first and second field buses, wherein said communication control unit further comprises operation request transmission means for transmitting an operation request to the field apparatus via the first and second field buses based on control information transmitted from the main control unit; first judgment means for judging whether or not response information corresponding to the operation request is transmitted from the field apparatus via one of the first and second field buses; means for receiving the transmitted response information when the first judgment means judges that the response information is transmitted so as to transmit the received response information to the main control unit; second judgment means for judging whether or not response information corresponding to the operation request is transmitted from the field apparatus via other of the first and second field buses when the first judgment means judges that the response information is transmitted; means for receiving the transmitted response information when the second judgment means judges that the response information is transmitted so as to transmit the received response information to the main control unit; and means for transmitting information to indicate the generation of failure in the first and second field buses to the main control unit when the second judgment means judges that the response information is not transmitted.

According to the further aspect of the present invention, even if one of the duplicated field buses fails, the information communication to the field apparatus can be continued through other of the duplicated field buses, making it possible to improve the reliability of the field apparatus control system with respect to the failure of the field bus.

To achieve such object, according to still further aspect of the present invention, there is provided a storage medium used in a field apparatus control system for controlling a field apparatus connected to a field bus, said field apparatus control system comprising duplicated normal and standby main control units for controlling the field apparatus; and duplicated normal and standby computers for processing information communication between the normal and standby main control units and the field apparatus via the field bus, respectively, said storage medium being readable by at least one of the normal and standby computers comprising: means for causing at least one of the normal and standby computers to transmit an operation request to the field apparatus based on control information when the computer is the normal computer, said control information being transmitted from the normal main control unit; means for causing at least one of the normal and standby computers to receive response information corresponding to the operation request transmitted from the field apparatus to an address, said address being allocated to the normal and standby computers; means for causing at least one of the normal and standby computers to transmit the received response information to the main control unit of a system corresponding to the at least one of the normal and standby computers; means for causing at least one of the normal and standby computers to judge whether or not failure occurs to the system; means for causing at least one of the normal and standby computers to, when the computer is the normal computer and it is judged that failure occurs to the computer, stop the operation of the computer; and means for causing at least one of the normal and standby computers to monitor operation of the normal computer when the computer is the standby computer, and when, by the monitored result, detecting the stop of the operation of the normal computer, to switch the computer which is the standby computer to the normal computer.

As described above, according to the present invention, where a same address is allocated to the normal system communication control unit and the standby system communication control unit, the communication control unit is duplicated without using an original protocol so that even if a failure occurs to one unit, information communication processing between the corresponding main control unit and the field apparatuses via the field bus can be continued using the non-failed communication control unit, so that the reliability of the field apparatus control system can be improved.

Furthermore, according to the present invention, where the communication control unit is duplicated and the field bus is also duplicated, information communication with the field apparatuses via the field bus is continued, even if a failure occurs to one of the duplicated communication control units, and information communication processing for the field apparatuses can be continued using the other field bus even if a failure occurs to one field bus. Therefore the reliability against a communication control unit failure and field bus (transmission path) failure can be considerably improved.

BRIEF DESCRIPTION OF THE DRAWINGS

Other aspects of the present invention will become apparent from the following description of embodiments with reference to the accompanying drawings in which.

DETAILED DESCRIPTION OF THE PREFERRED EMBODIMENTS

The embodiments of the present invention will be described hereinafter.

First Embodiment

Figure 1:
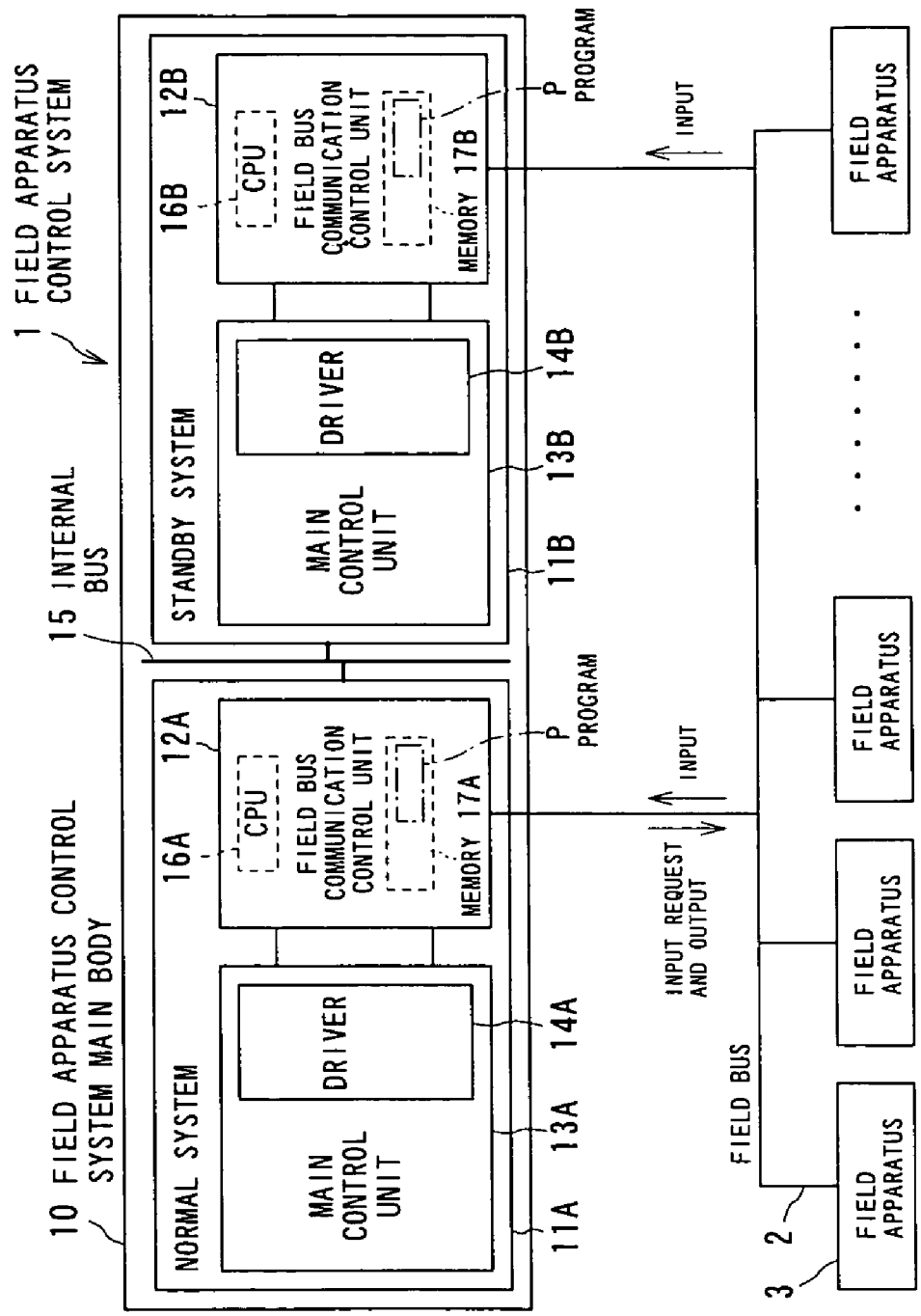
FIG. 1 is a block diagram depicting a general configuration of a field apparatus control system according to a first embodiment of the present invention.

FIG. 1 is a block diagram depicting a general configuration of a field apparatus control system according to the first embodiment of the present invention.

The field apparatus control system 1 shown in FIG. 1 has a field apparatus control system main body 10 for controlling a plurality of field apparatuses 3 for controlling plant apparatuses of a plant, which are connected to the field bus 2, and this field apparatus control system main body (hereafter referred to "system main body") 10 has a duplicated standby redundant configuration.

As shown in FIG. 1, the system main body 10 has a duplicated control system, that is, the normal control system (hereafter normal system) 11A and the standby control system (hereafter standby system) 11B, as control systems for a plurality of field apparatuses 3.

The plurality of field apparatuses includes input apparatuses (for example, in a case of a power plant as a plant, status information input apparatuses for inputting status information such as current value and voltage value of a plant apparatus in the power plant into the system main body 10) and output apparatuses (for example, in a case of a power plant as a plant, displays for operators and switching apparatuses for switching a predetermined plant apparatus) connected to the field bus 2.

The normal system 11A and the standby system 11B are connected to the field bus 2 respectively such that communication is possible, and comprise field bus communication control units 12A and 12B for information communication processing between the systems 11A and 11B and the field apparatuses 3, respectively.

The normal system 11A and the standby system 11B also comprise main control units 13A and 13B each of which has a CPU (computer) for controlling field apparatuses 3 and a memory for storing a program and data related to the processing of the CPU, which the CPU can read, respectively.

The normal system 11A and the standby system 11B also comprise drivers (program modules) 14A and 14B, which are incorporated in the main control units 13A and 13B so as to run thereon, respectively. The drivers 14A and 14B each control information input/output processing between the field bus communication control unit and the main control unit, of the normal system 11A and the standby system 11B, respectively.

The system main body 10 has an internal bus 15 which enables communication of the normal system 11A (field bus communication control unit 12A, main control unit 13A) and the standby system 11B (field bus communication control unit 12B, main control unit 13B).

The field bus communication control units 12A and 12B have CPUs (computers) 16A and 16B for executing information communication processing between the respective systems 11A and 11B (drivers 14A and 14B) and the field apparatuses 3, and memories 17A and 17B as computer-readable storage mediums for storing data programs P related to the processing of the respective CPUs, which the CPUs can read.

For example, as each of the memories 17A and 17B, a floppy disk, magneto-optical disk CD-R, CD-R/W, DVD, and IC memory can be used.

For the field bus communication control unit 12A of the normal system and the field bus communication control unit 12B of the standby system, which are connected to the field bus 2, addresses are allocated for specifying the field bus communication control units 12A and 12B on the information communication network via the field bus 2.

Particularly in the present embodiment, a same address is allocated to each of the field bus communication control units 12A and 12B, and the allocated address is held in each microprocessor of each field apparatus 3, and each of the respective field bus communication control units 12A and 12B.

The normal system 11A (field bus communication control unit 12A, normal system main control unit 13A, driver 14A) and the standby system 11B (field bus communication control unit 12B, standby system main control unit 13B, driver 14B) execute the same programs (program modules), and the standby system 11B maintains the same status as the normal system 11A (hot standby system).

Overall operation of the field apparatus control system 1 of the present embodiment will now be described focusing mainly on the processing of the field bus communication control units 12A and 12B.

Each of the field bus communication control units (hereafter communication control units) 12A and 12B of the normal system 11A and the standby system 11B operates based on the program P stored in the memories 17A and 17B.

Figure 2:
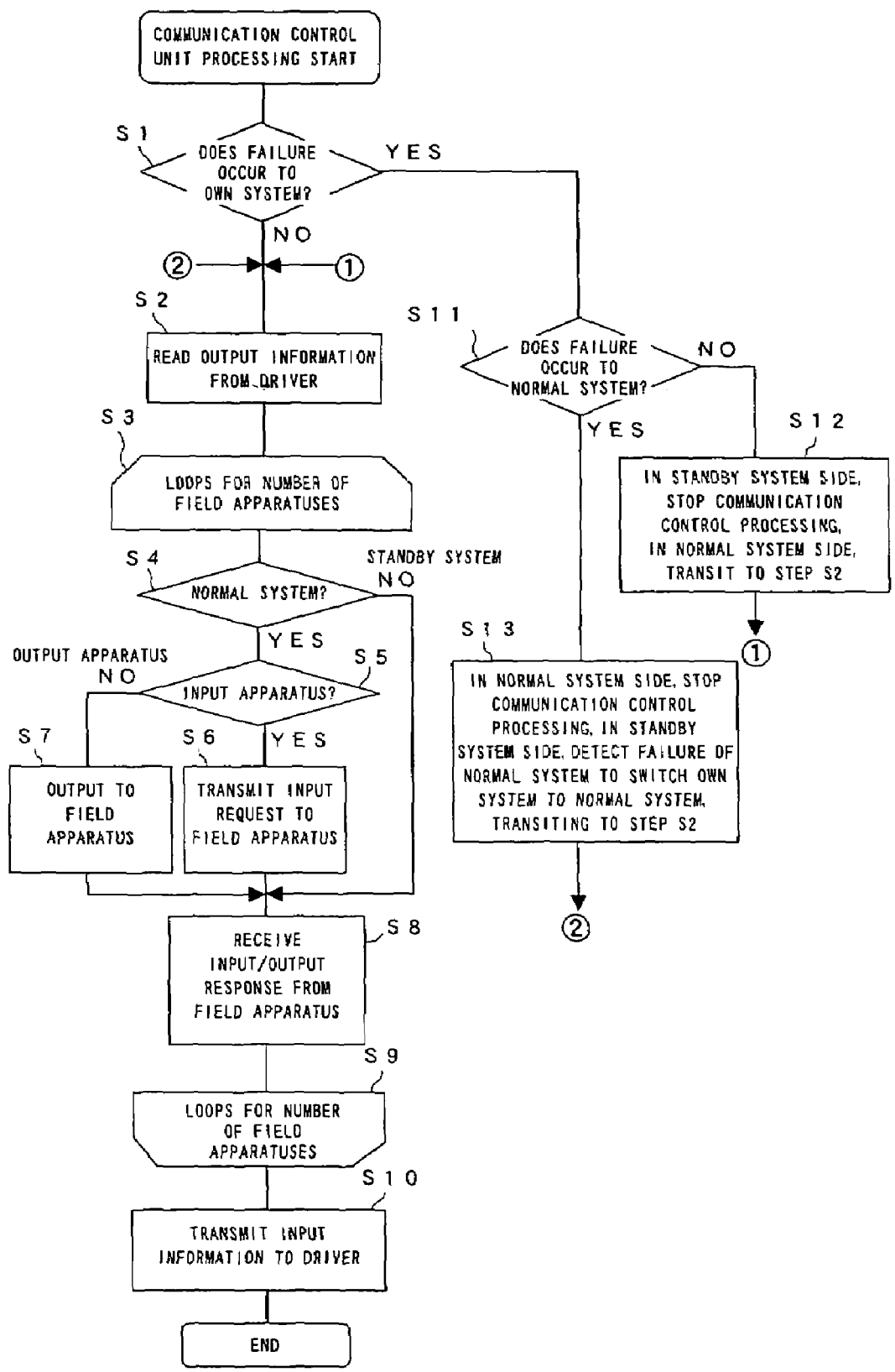
FIG. 2 is a flow chart depicting an example of processing of a field bus communication control unit of the field apparatus control system according to the first embodiment of the present invention.

That is, the communication control units 12A and 12B periodically diagnose whether or not a failure occurs to the local systems 11A and 11B, in each hardware block and each software module (for example, see Step S1 of FIG. 2), and if it is judged that a failure does not occur as a result of the judgment (normal operation) (e.g., Step S1→NO), then the communication control units 12A and 12B read output information for the first field apparatus 3 from the drivers 14A and 14B of the main control units 13A and 13B, respectively (e.g., Step S2).

Because of this output information for the first field apparatus 3, the communication control units 12A and 12B skip Step S3 which indicates the loop end of the later mentioned repeat processing, and judges whether it is the communication control unit in the normal system or not (Step S4).

Since the judgment result by the normal system communication control unit 12A in Step S4 is YES (normal system), the communication control unit 12A judges whether or not the output information which is read is for the input apparatus (field apparatus for input) (Step S5).

As a result of the judgment in Step S5, if the output information is on the field apparatus for input (Step S5→YES), the communication control unit 12A transmits an input request to the corresponding field apparatus 3 via the field bus 2 (Step S6).

The corresponding field apparatus 3 executes processing (for example, status information detection processing) based on the content of the transmitted input request, and transmits the input response (for example, detected state information) to the address of the communication control unit As a result of the judgment in Step S5, if the output information is on the output apparatus (field apparatus for output) (Step S5→NO), the communication control unit 12A transmits the output information to the corresponding field apparatus for output via the field bus 2 (Step S7).

The corresponding field apparatus 3 executes processing (e.g., such control processing as open/close operation switching processing) based on the information content of the transmitted output information, and transmits the output response (e.g., status information after control processing) to the address of the communication control unit via the field bus 2.

On the other hand, because the result of the judgment by the standby system communication control unit 12B in Step S4 is NO (standby system), the communication control unit 12B sifts to the processing of Step S9, which will be described later, without transmitting an input/output request in Step S6 or Step S7.

Then, since the same address has been assigned to the normal system communication control unit 12A and the standby system communication control unit 12B, the input response or the output response transmitted from the field apparatus 3 is transmitted to each of the normal system communication control unit 12A and each of the standby system communication control unit 12B, and the normal system communication control unit 12A and the standby system communication control unit 12B receives the transmitted input response or the output response (input/output response) (Step S8).

Then, the normal system communication control unit 12A returns to the processing to indicate the loop end in Step S3 as a processing to indicate the loop end in Step S9, executes the processing in Step S3 to Step S9 repeatedly according to the output information for all the field apparatuses 3 (Step S9), and as a result, all the input/output responses corresponding to all pieces of the output information are received by the normal system communication control unit 12A and the standby system communication control unit 12B, respectively.

The normal system communication control unit 12A and the standby system communication control unit 12B transmits the input/output responses corresponding to all the received pieces of the output information to the drivers 14A and 14B of the local systems 11A and 11B (Step S10), and processing ends.

In a case where it is diagnosed that failure occurs as a result of the judgment in Step S1 (when failure occurs, Step S1→YES), the communication control unit of the failed system (the normal system 11A or the standby system 11B) judges whether or not the failed system is the normal system 11A (Step S11).

If the failed system is the standby system 11B, the result of judgment by the standby system communication control unit 12B in Step S11 is NO (standby system), so the standby system communication control unit 12B stops communication control processing, that is, the communication control processing between the driver 14B and the field apparatus 3, and the communication control unit 12A of the normal system 11A, which is not failed, transits to Step S2 and executes processing in Step S2 to Step S10 (Step S12).

In a case where the failed system is the normal system 11A, the result of judgment by the normal system communication control unit 12A in Step S11 is YES (normal system), so the normal system communication control unit 12A stops communication processing, that is, communication control processing between the driver 14A and the field apparatus 3, the standby system communication control unit 12B, which is monitoring the operation of the normal system communication control unit 12A, detects the occurring of the failure (stop of communication control processing) in the normal system communication control unit 12A, switches the system (standby system) to the normal system, and transits to Step S2 as the normal system communication control unit 12B, and executes processing in Step S2 to Step S10 (Step S13).

As a result, if a failure occurs to the normal system 11A, the communication control unit 12B of the standby system 11B executes processing so that information input/output processing between the main control unit 13B (driver 14B) and the field apparatus 3 via the field bus 2 can be continuously executed.

As described above, according to the field apparatus control system 1 of the present embodiment, the field apparatus control system is duplicated as the normal system 11A and the standby system 11B, and a same address is allocated to the communication control units 12A and 12B of the normal system 11A and the standby system 11B, so it is possible to transmit the same input/output response as the normal system communication control unit 12A to the standby system communication control unit 12B.

Therefore, even if a failure occurs to the normal system 11A, it is possible to continuously execute information input/output processing between the main control unit 13B (driver 14B) and the field apparatus 3 via the field bus 2, including the input/output request transmission processing for the field apparatus 3 and processing to transmit the input/output response to the driver 14B, which is transmitted to the standby system communication control unit 12B, so that the reliability of the field apparatus control unit 10 can be considerably improved.

In addition, by assigning a same address to the communication control units of the normal system and the standby system, the standby system can receive the input response and the output response from the field apparatus to the normal system, so that the standby system can always hold the latest state of the plant. Therefore it is unnecessary to update the plant state when operation is switched from the normal system to the standby system, which means that the time required to switch processing is decreased compared to the case when a different address is assigned to each communication control unit, making it possible to improve the operating efficiency of the system.

Second Embodiment

Figure 3:
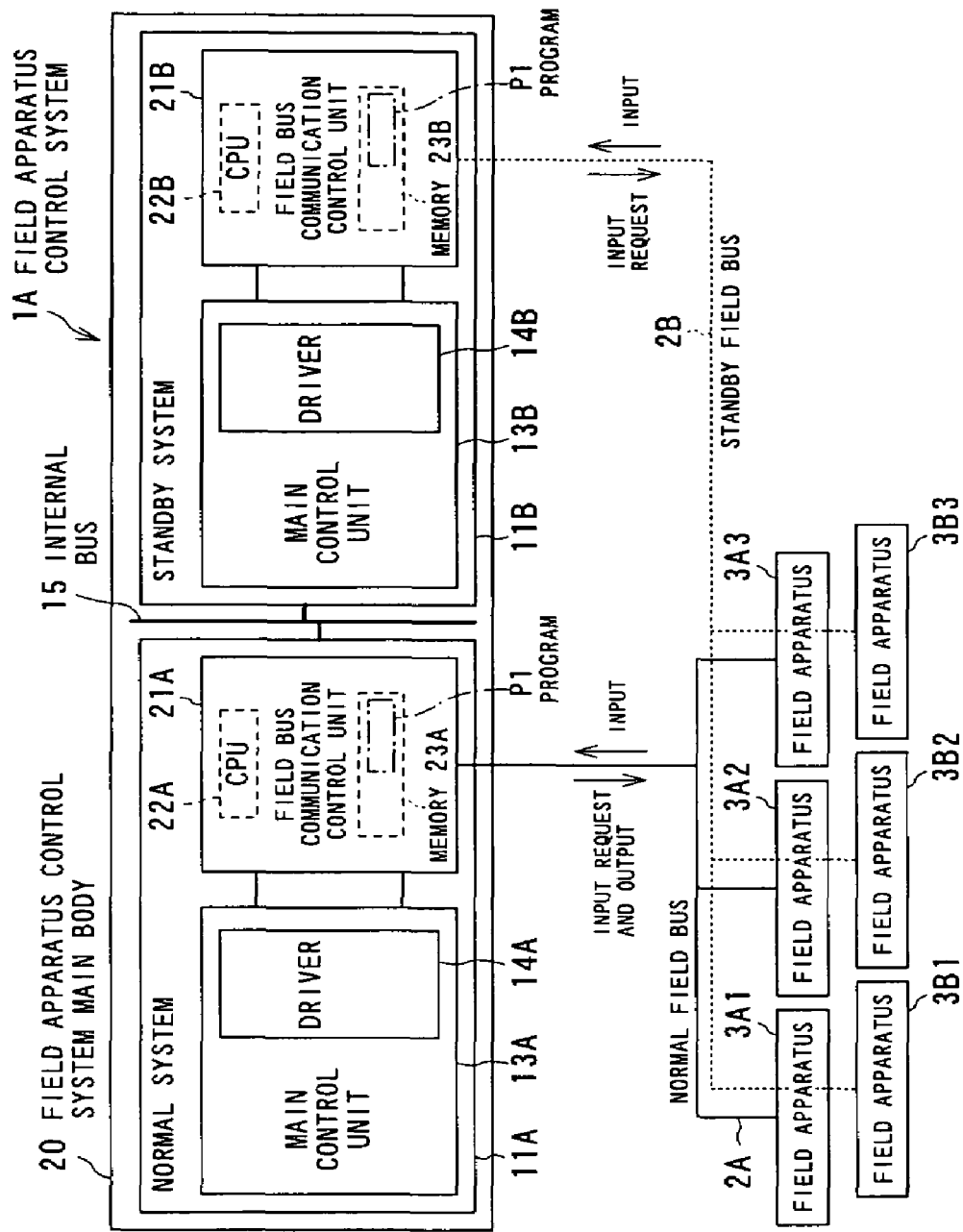
FIG. 3 is a block diagram depicting a general configuration of a field apparatus control system according to a second embodiment of the present invention.
Figure 4:
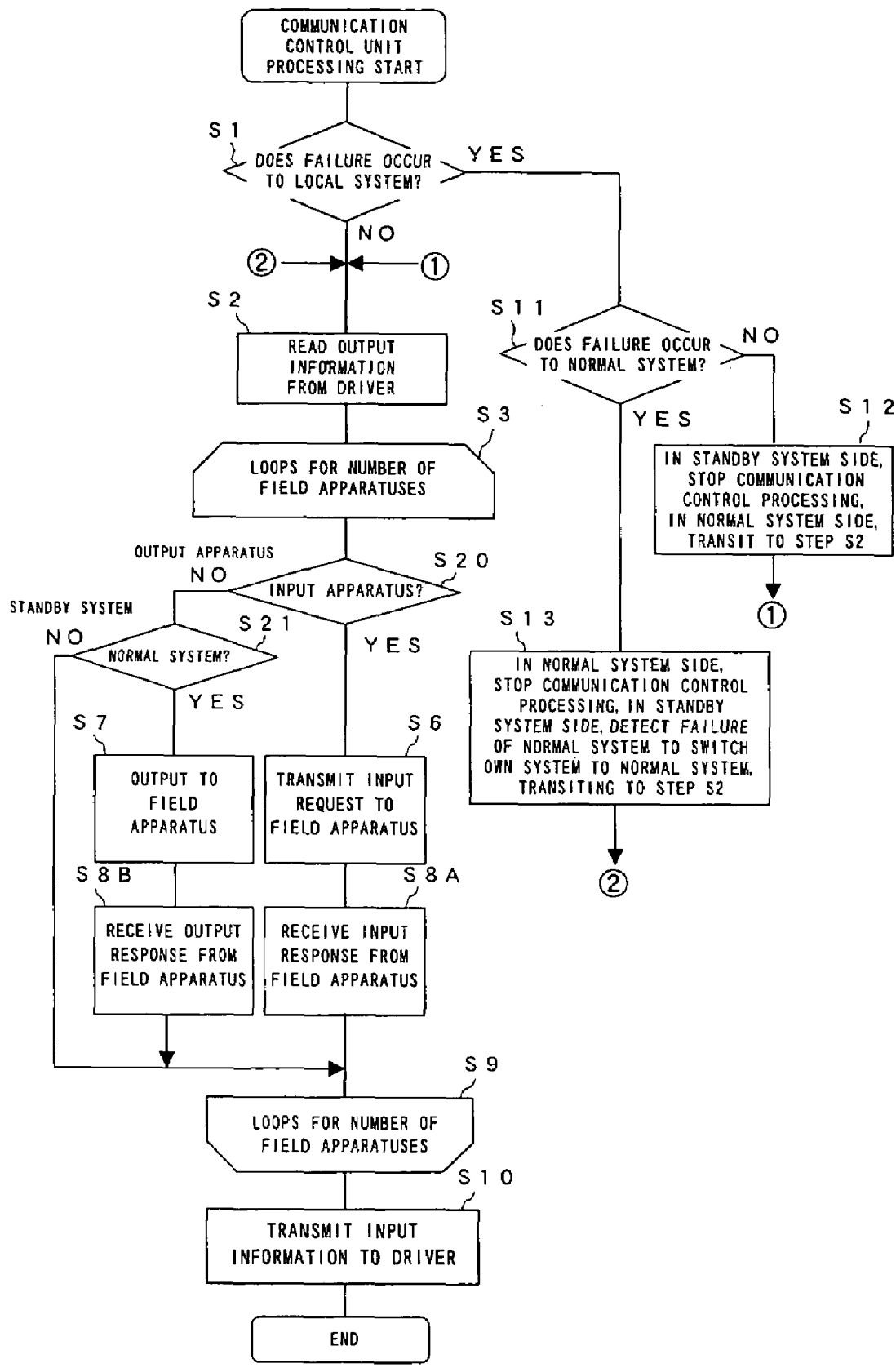
FIG. 4 is a flow chart depicting an example of processing of a field bus communication control unit of the field apparatus control system according to the second embodiment of the present invention.

FIG. 3 is a block diagram depicting a general configuration of a field apparatus control system according to the second embodiment of the present invention.

In the field apparatus control system 1A shown in FIG. 3, components the same as those in the field apparatus control system 1 in FIG. 1 are denoted with the same symbols, for which description is omitted or simplified.

In the present embodiment, the field bus 2 and a plurality of field apparatuses 3 are duplicated to be a standby redundancy structure respectively, as shown in FIG. 3.

That is, the field bus 2 is comprised of the normal system field bus 2A and the standby system field bus 2B, and the plurality of field apparatuses 3 are comprised of the normal system field apparatuses 3A (3A1 to 3A3) connected to the normal system field bus 2A and the standby system field apparatuses 3B (3B1 to 3B3), which is the same type as the normal system field apparatuses 3A (3A1 to 3A3) connected to the standby system field bus 2B.

The system main body 20 of the present embodiment has the normal system 11A as a control system for the normal system field apparatuses 3A, including the input/output apparatuses connected to the normal system field bus 2A, and has the standby system 11B as a control system for the standby system field apparatuses 3B connected to the standby system field bus 2B.

The normal system 11A is connected to the normal system field bus 2A, and has a field bus communication control unit (communication control unit) 21A for executing information communication processing between the local system 11A and the normal system field apparatuses 3A, and the standby system 11B is connected to the standby system field bus 2B, and has a field bus communication control unit (communication control unit) 21B for executing information communication processing between the system 11B and the standby system field apparatuses 3B.

The field bus communication control units 21A and 21B have CPUs (computers) 22A and 22B for executing information communication processing between the systems 11A and 11B (drivers 14A and 14B) and the field apparatuses 3, and memories 23A and 23B as computer-readable storage mediums that the CPUs can read for storing data programs P1 related to the processing of the respective CPUS.

General operation of the field apparatus control system 1A of the present embodiment will now be described focusing largely on the processing of the field bus communication control units 21A and 21B.

Each of the field bus communication control units (hereafter communication control units) 21A and 22B of the normal system 11A and the standby system 11B operates based on the program P1 stored in the memories 23A and 23B.

That is, just like the first embodiment, the communication control units 21A and 21B of the normal system 11A and the standby system 11B execute processing in Steps S1 to S3, and read the output information from the predetermined normal system field apparatus 3A and the standby system field apparatus 3B during normal operation.

At this time, according to the present embodiment, the normal system communication control unit 21A and the standby system communication control unit 21B first judge whether the output information read from the predetermined field apparatuses 3A and 3B is for the input apparatus 3 (Step S20).

If the output information is for the input apparatus (field apparatus for input) as a result of the judgment in Step S20 (Step S20→YES), then the normal system communication control unit 21A and the standby system communication control unit 21B, just like the first embodiment, execute processing in Step S6 for the corresponding normal system field apparatus 3A and the standby system field apparatus 3B, so that the input request is transmitted to each of the normal system field apparatus 3A and the standby system field apparatus 3B, and the input response transmitted from each of the corresponding normal system field apparatus 3A and the standby system field apparatus 3B is received by each of the corresponding normal system communication control unit 12A and the standby system communication control unit 12B (Step S8A).

If the output information is for the output apparatus 3 as a result of the judgment in Step S20, on the other hand (Step S20→NO), then the normal system communication control unit 21A and the standby system communication control unit 21B judge whether the communication control unit is the normal system (Step S21).

Since the judgment result by the normal system communication control unit 21A in Step S21 is YES (normal system), the communication control unit 21A executes processing in Step S7 for the normal system field apparatus 3A, so that the output response transmitted from the corresponding normal system field apparatus 3A is received by the normal system communication control unit 12A (Step S8B).

Since the judgment result by the standby system communication control unit 21B in Step S21 is NO (standby system), the communication control unit 21B transmits the later mentioned processing in Step S9 without executing the output information transmission processing in Steps S7 and S8B, so as to prevent the transmission of different output information to the same type of field apparatuses 3A and 3B.

Then the normal system communication control unit 21A returns to the processing to indicate loop end in Step S3 as a processing to indicate loop end in Step S9, executes the processing in Steps S3, S20, S21, S6 to S8A and S8B repeatedly (loop), executes the input/output processing operation corresponding to the output information to all the normal system field apparatuses 3A (Step S9), and as a result, all the input response/output responses from the normal system field apparatuses 3A corresponding to all the output information are received by the normal system communication control unit 12A respectively.

The standby system communication control unit 21B, on the other hand, returns to the processing to indicate the loop end in Step S3 as the processing to indicate the loop end in Step S9, executes processing in Steps S3, S20, S21, and S6 to S7 repeatedly (loop), executes input processing corresponding to the output information to all the input apparatuses (field apparatuses 3 for input) in the standby system field apparatuses 3B (Step S9), and as a result, all input responses from all the input apparatuses in the standby system field apparatuses 3B are received by the standby system communication control unit 21B, respectively.

Then, by the processing in Step S10, the input responses/output responses corresponding to all the output information to the normal system field apparatuses 3A are transmitted to the driver 14A of the normal system 11A, and input responses corresponding to all the output information to the input apparatuses in the standby field apparatuses 3B are transmitted to the driver 14B of the standby system 14B.

In the present embodiment as well, if a failure has occurred as a result of the judgment in Step S1 (Step S1→YES), and if the failed system is the standby system 11B for example, processing in Steps S2, S3, S20, S21, S6 to S8A and S8B are repeatedly executed for the normal system field apparatuses 3A by the communication control unit 21A of the normal system 11A which is not failed, so that information input/output processing between the main control unit 13A (driver 14A) and the normal system field apparatuses 3A is executed continuously (see Steps S11 to S12).

If the failed system is the normal system 11A, on the other hand, the failure generation in the normal system 11A (operation stop of the normal system communication control unit 21A) is detected by the communication control unit 21B, the communication control unit 21B is switched to the normal system, and processing in Steps S2, S3, S20, S21, S6 to S8A and S8B is repeatedly executed by this communication control unit 21B, and information input/output processing between the main control unit 13B (driver 14B), and standby system field apparatuses 3B is continuously executed (see Steps S11, S13).

As a result, just like the first embodiment, even if a failure occurs to the normal system 11A, information input/output processing between the main control unit 13B (driver 14B) and the standby system field apparatuses 3B via the field bus 2 is continuously executed by the communication control unit 21B of the standby system 11B.

In particular according to the present embodiment, the field apparatuses 3 are duplicated (normal system field apparatuses 3A and standby system field apparatuses 3B) so that even if a failure occurs to at least one, for example field apparatus 3A1, of the normal system field apparatuses 3A, the above mentioned processing in Steps S2, S3, S20, S21, S6 to S8A and S8B is executed for the standby system field apparatuses 3B1 corresponding to the field apparatus 3A1 using the standby system communication control unit 21B, so that information input/output processing between the field apparatus 3B1, which is identical to the failed field apparatus 3A1, and the main control unit 13B (driver 14B) can be continuously executed.

Therefore, in addition to the effect of the first embodiment, the reliability of the field apparatus control unit 20 can be improved even more than the first embodiment, since even if a failure occurs to one of the duplicated field apparatuses 3, input/output request transmission processing and input/output response receiving processing for all types of field apparatuses 3, including a field apparatus which type is the same as the failed field apparatus, can be continuously executed.

Third Embodiment

Figure 5:
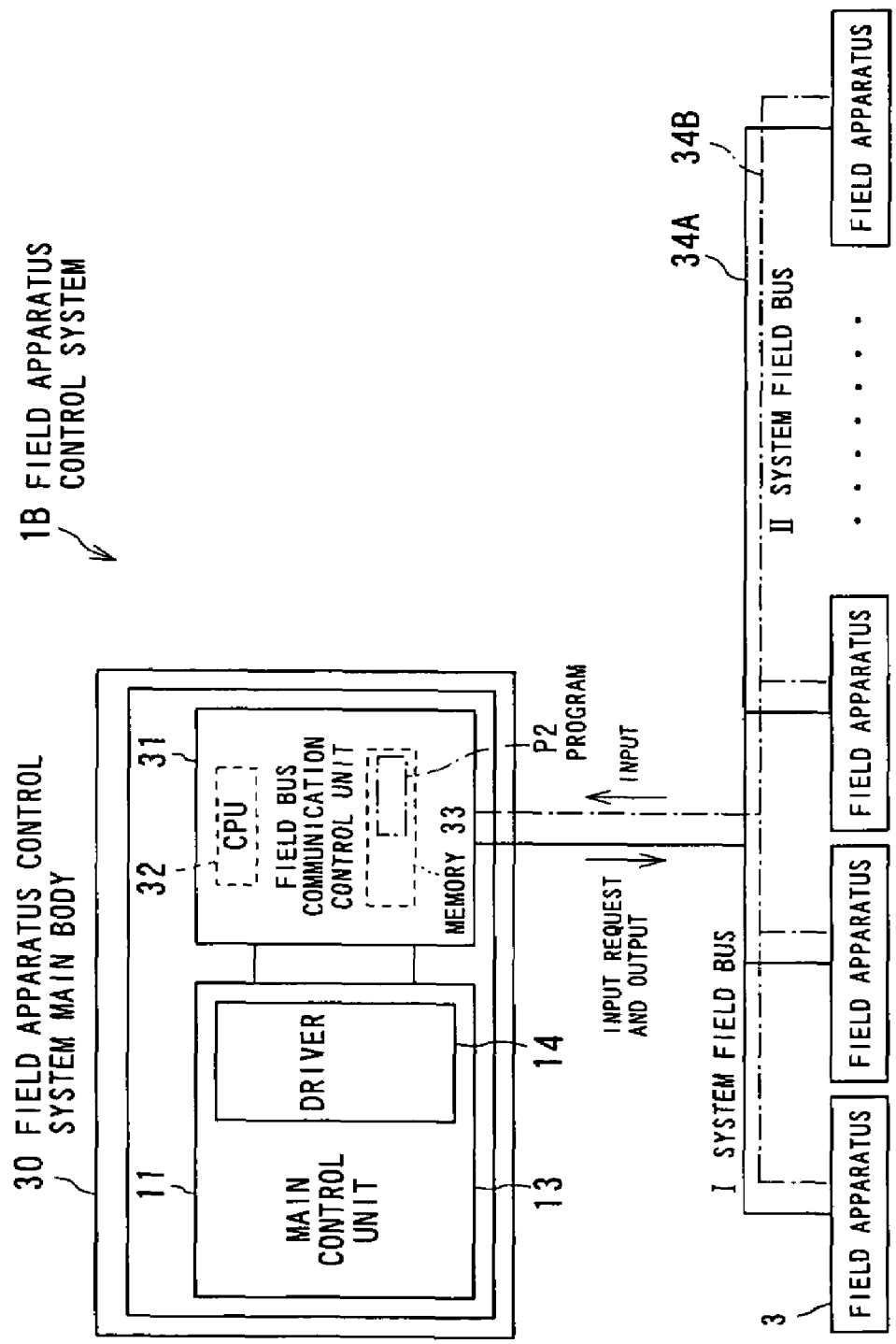
FIG. 5 is a block diagram depicting a general configuration of a field apparatus control system according to a third embodiment of the present invention.
Figure 6:
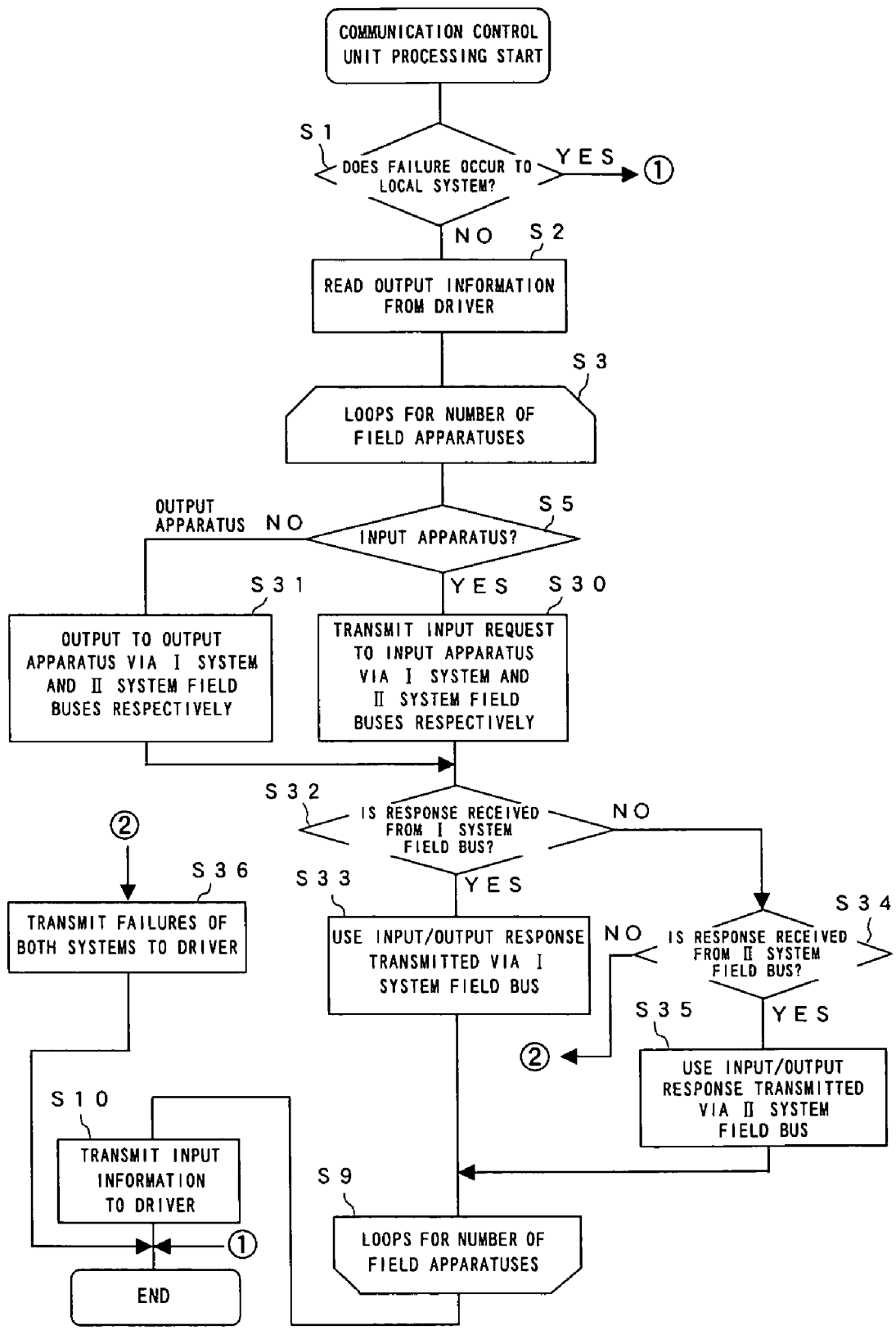
FIG. 6 is a flow chart depicting an example of processing of a field bus communication control unit of the field apparatus control system according to the third embodiment of the present invention.

FIG. 5 is a block diagram depicting a general configuration of a field apparatus control system 1B according to the third embodiment of the present invention. Components the same as those in the field apparatus control system 1 in FIG. 1 are denoted with the same symbols, for which description is omitted or simplified.

In the present embodiment, the system main body 30 has a single control system 11 controlling a plurality of field apparatuses 3, including an input apparatus and output apparatus as shown in FIG. 5.

This control system 11 has the same configuration as the normal system control system 11A or the standby system control system 11B shown in the first embodiment, and comprises a field bus communication control unit 31 for processing information communication between the corresponding system 11 and the field apparatuses 3, a main control unit 13 for controlling the field apparatuses 3, and a driver 14 incorporated into the main control unit 13.

The field bus communication control unit 31 has a CPU (computer) 32 for executing information communication processing between the system 11 (driver 14) and the field apparatuses 3, and a memory 33 as a computer-readable storage medium for storing a data program P2 related to the processing of the CPU, which the CPU can read.

In the present embodiment, each field apparatus 3 is connected to the duplicated transmission paths (I system field bus 34A, II system field bus 34B) respectively, and the field bus communication control unit (communication control unit) 31 is connected to the I system field bus 34A and the II system field bus 34B so that communication is possible.

General operation of the field apparatus control system 1B of the present embodiment will now be described focusing largely on the processing of the communication control unit 31.

The field bus communication control unit (hereafter communication control unit) 31 of the system 11 operates based on the program P2 stored in the memory 32.

In the present embodiment, the communication control unit 31 executes processing in Steps S1 to S3, just like the first embodiment, and reads the output information to the field apparatuses 3 in a normal operation. If a failure has occurred as a result of the judgment in Step S1 (Step S1→YES), the communication control unit 31 ends processing.

If a failure has not occurred as the result of the judgment in Step S1 (Step S1→NO), then, the communication control unit 31 executes input apparatus (field apparatus for input)/output apparatus (field apparatus for output) judgment processing in Step S5, and if the output information is on an input apparatus (Step S5→YES), the communication control unit 31 transmits an input request to the corresponding field apparatus (field apparatus for input) 3 via the I system field bus 34A and II system field bus 34B, respectively (Step S30).

If the output information is on the output apparatus 3, on the other hand (Step S5→NO), then the communication control unit 31 transmits output information to the corresponding field apparatus 3 via the I system field bus 34A and the II system field bus 34B, respectively (Step S31).

Then the communication control unit 31 judges whether an input response or output response (input/output response) has been transmitted from the I system field bus 34A (Step S32).

At this time, the field apparatus 3 corresponding to the input request executes processing based on the content of the transmitted input request, transmits the input response to the address of the communication control unit 31 via the I system field bus 34A and the II system field bus 34B, and the field apparatus 3 corresponding to the output information executes processing based on the content of the transmitted output information, and transmits the output response to the address of the communication control unit 31 via the I system field bus 34A and the II system field bus 34B.

When a failure has not occurred to the I system field bus 32A, the input/output response from the field apparatus 3 for input/output is accurately transmitted to the communication control unit 31 via the I system field bus 34A, so the judgment by the communication control unit 31 in Step S32 is YES, and the communication control unit 31 receives the input/output response transmitted via the I system field bus 34A (Step S33) and transits to processing in Step S9.

If a failure has occurred to the I system field bus 34A, the input/output response from the field apparatus 3 for input/output is not transmitted to the communication control unit 31 via the I system field bus 34A, so that the judgment by the communication control unit 31 in Step S32 is NO, and the communication control unit 31 judges whether the input/output response has been transmitted from the II system field bus 34B (Step S34).

When a failure has not occurred to the II system field bus 34B, the input/output response from the input/output apparatus 3 is accurately transmitted to the communication control unit 31 via the II system field bus 34B, so that the judgment by the communication control unit 31 in Step S34 is YES, and the communication control unit 31 receives the input/output response transmitted via the II system field bus 34B (Step S35) and transits to processing in Step S9.

The communication control unit 30 returns to the processing to indicate the loop end in Step S3 as a processing to indicate the loop end in Step S9, executes processing in Steps S3, S5 and S30 to S35 repeatedly (loop), executes the input/output processing corresponding to the output information to all the field apparatuses 3 (Step S9), and as a result, input/output responses corresponding to all the output information are received by the communication control unit 31, respectively.

Then, the communication control unit 31 notifies the input responses/output responses corresponding to all the received output information to the driver 14 (Step S10) and ends processing.

If a failure has occurred to the II system field bus 34B during processing in Steps S3, S5, and S30 to S35 on the other hand, the input/output responses from the field apparatuses 3 for input/output are not transmitted to the communication control unit 31 via the II system field bus 34B, so the judgment by the communication control unit 31 in Step S34 is NO, and the communication control unit 31 transmits the failures of the I system field bus 32A and II system field bus 32B (both system failures) to the driver 14 (Step S36), and end processing.

That is, in the present embodiment, the field bus for connecting the communication control unit 31 and each field apparatus 3, such that communication is possible, is duplicated to be the I system field bus 34A and the II system field bus 34B, so that even if a failure has occurred to the I system field bus 34A which is used during normal operation, information input/output processing between the communication control unit 31 and each field apparatus 3 can be continuously executed via the II system field bus 34B (see S32, S34 and S35), therefore the reliability of the field apparatus control unit 30 can be improved.

Fourth Embodiment

Figure 7:
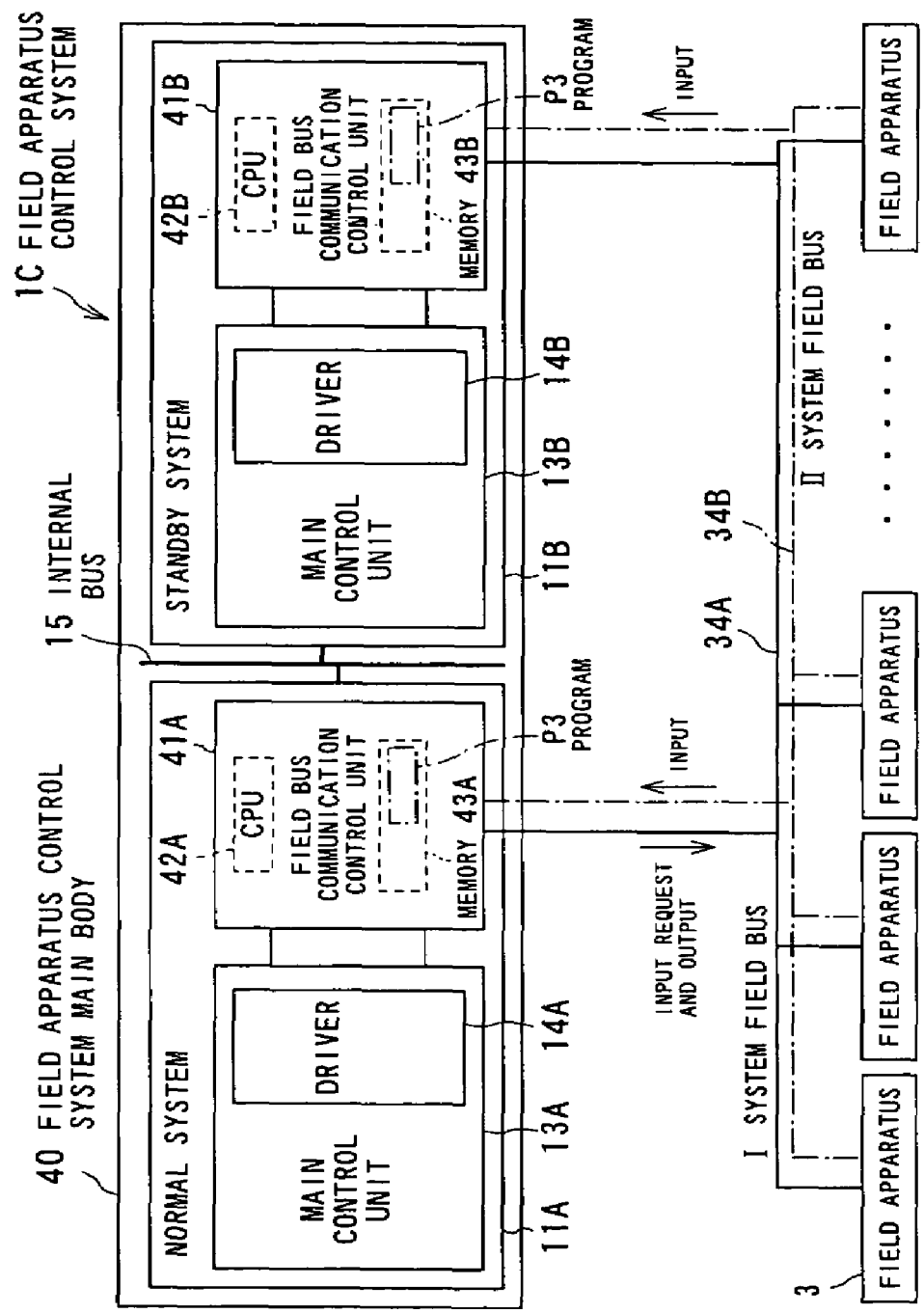
FIG. 7 is a block diagram depicting a general configuration of a field apparatus control system according to a fourth embodiment of the present invention.
Figure 8:
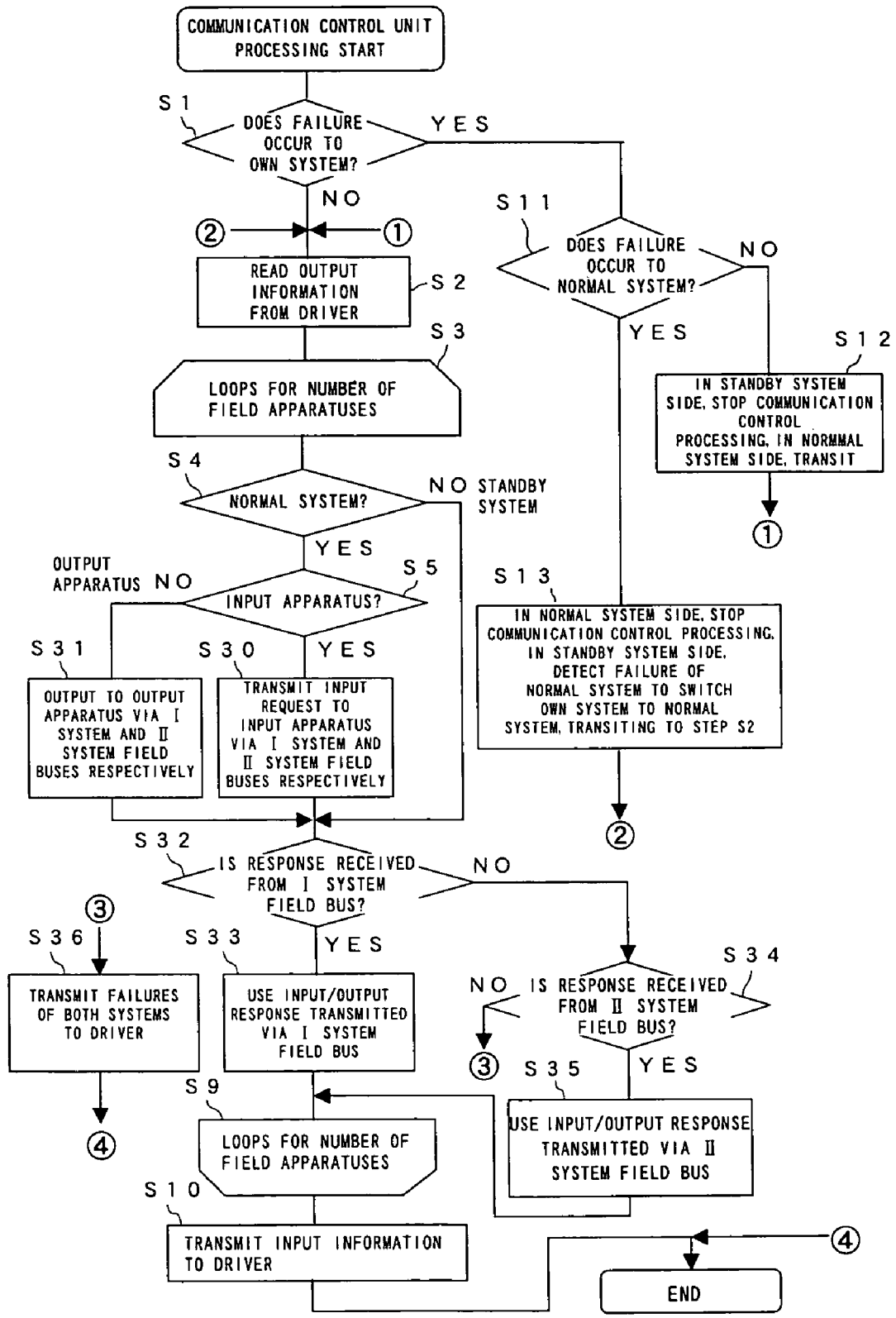
FIG. 8 is a flow chart depicting an example of processing of a field bus communication control unit of the field apparatus control system according to the fourth embodiment of the present invention.

FIG. 7 is a block diagram depicting a general configuration of a field apparatus control system 1C according to the fourth embodiment of the present invention.

In the field apparatus control system 1C in FIG. 7, components the same as those in the field apparatus control system 1 in FIG. 1 are denoted with the same symbols, for which description is omitted or simplified.

Just like the first embodiment, the system main body 40 of the present embodiment has a duplicated control system, that is, the normal system 11A and the standby system 11B as a control system for a plurality of field apparatuses 3.

Similarly to the first embodiment, the normal control system 11A and the standby control system 11B comprise field bus communication control units 41A and 41B for processing information communication between the local systems 11A and 11B and the field apparatuses 3, main control units 13A and 13B for controlling the field apparatuses 3, and drivers 14A and 14B which are incorporated into the main control units 13A and 13B so as to run thereon, respectively.

The field bus communication control units 41A and 41B have CPUs (computers) 42A and 42B for executing information communication processing between corresponding systems 11A and 11B (drivers 14A and 14B) and the field apparatuses 3, and memories 43A and 43B as computer-readable storage mediums for storing data programs P3, which the CPUs can read, related to the processing of corresponding CPUs.

In addition, just like the third embodiment, in the present embodiment, each field apparatus 3 is connected to the duplicated transmission paths (I system field bus 34A, II system field bus 34B), respectively, and the field bus communication control units (communication control units) 41A and 41B are connected to the I system field bus 32A and the II system field bus 32B respectively, such that communication is possible.

General operation of the field apparatus control system 1C of the present embodiment will now be described focusing largely on the processing of the communication control units 41A and 41B.

Each of the field bus communication control units (hereafter communication control units) 41A and 41B of the normal system 11A and the standby system 11B operates based on the program P3 stored in the memories 43A and 43B.

That is, similarly to the first embodiment, the communication control units 41A and 41B of the normal system 11A and the standby system 11B execute processing in Steps S1 to S7, and transmit input request or output information to an input apparatus or an output apparatus (field apparatus 3 for input or field apparatus 3 for output) corresponding to the output information transmitted from the drivers 14A and 14B of the on systems 11A and 11B.

Then the communication control units 41A and 41B execute the processing in Steps S30 to S36 of the third embodiment respectively, that is, processing for judging a failure occurrence in the I system field bus 34A and the II system field bus 34B (see Step S32 and Step S34), processing for receiving input/output responses which are transmitted via an non-failed field bus 34A or 34B (see Step S33 and S35), and processing for notifying failures of both systems when failures have occurred to both systems (see Step S36), and repeatedly executes processing in the above mentioned Steps S3 to S7, S30 to S36, and S9 for all the output information.

In the present embodiment, when a failure occurs to one of the normal system 11A and the standby system 11B (Step S1→YES), the communication control units 41A and 41B execute processing in Steps S11 to S13, that is, processing for stopping communication control for the standby system communication control unit 41B when failure occurs to the standby system side (see Steps S1 to S12), and processing for the switching control right to the communication control unit 41B so as to execute communication control processing as the normal system when failure occurs to the normal system (see Steps S11 and S13), so that the communication control unit 41A or 41B of the non-failed control system (normal system or standby system) repeatedly executes processing in Steps S2 to S5, S30 to S33, and S9 to S10, that is, information input/output processing between the field apparatuses 3 and the non-failed control system (normal system 11A or standby system 11B) via the non-failed field bus (I system field bus 34A or II system field bus 34B).

As a result, in the present embodiment, even if a failure occurs to the normal system 11A, information input/output processing between the main control unit 13B (driver 14B) of the standby system 11B via the non-failed field bus (I system field bus 34A or II system field bus 34B) and each field apparatus 3 can be continuously executed, similar to the first embodiment, so that it is possible to considerably improve the reliability of the field apparatus control unit 40.

Furthermore, in the present embodiment, even if a failure occurs to the I system field bus 34A which is used during normal operation, information input/output processing between the communication control units 41A and 41B and each field apparatus 3 can be continuously executed via the II system field bus 34B, so that, in addition to the above mentioned effect, it is possible to improve the reliability of the field apparatus control unit 40 even more.

In the above embodiments, the transmission path to connect the field apparatus and the communication control units is simply stated as "field bus", but the field bus (transmission path) can be implemented by a cable system, or by a radio system using radio waves in a high frequency band.

Figure 9:
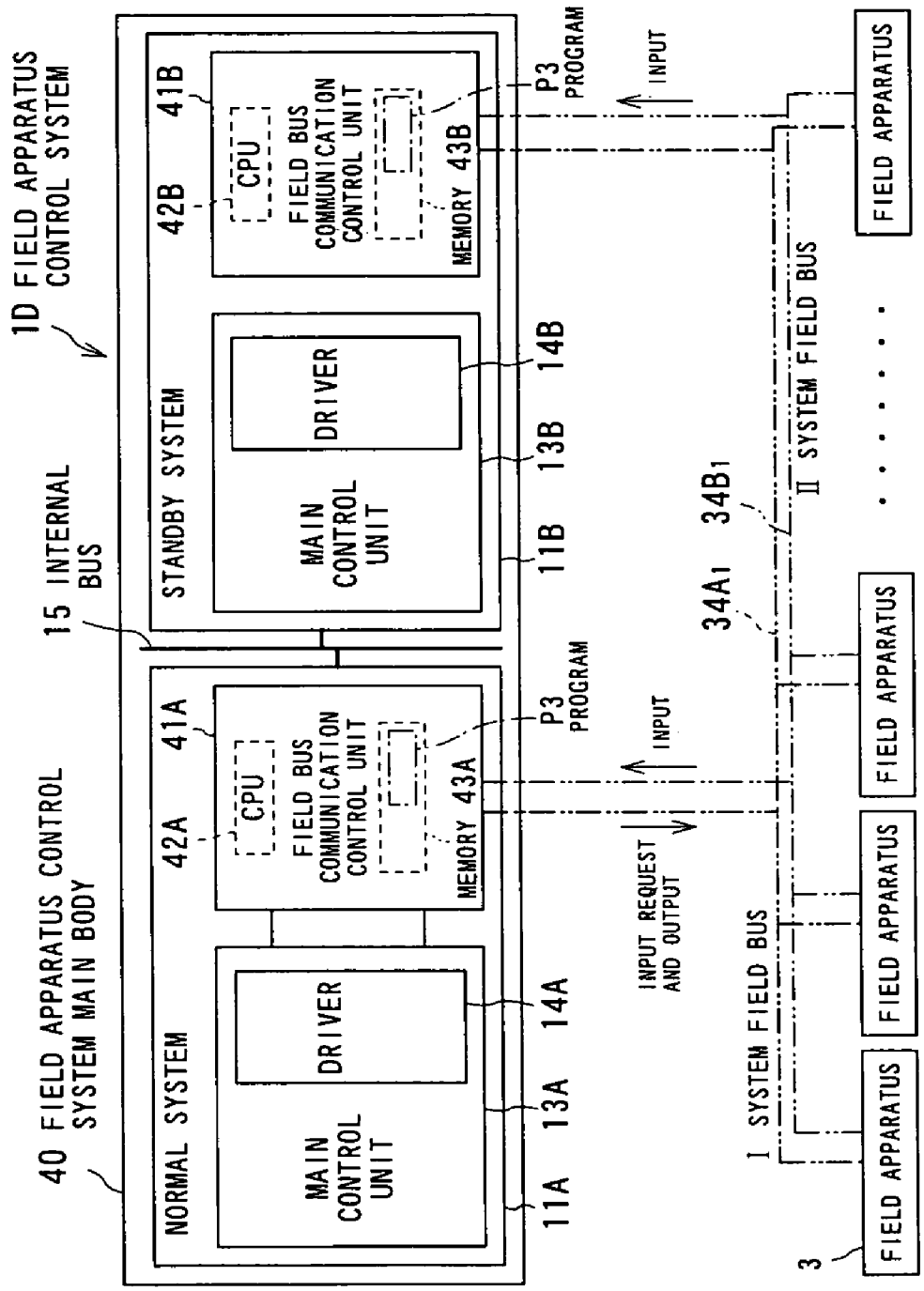
FIG. 9 is a block diagram depicting a modification of the field apparatus control system according to the fourth embodiment of the present invention.
Figure 10:
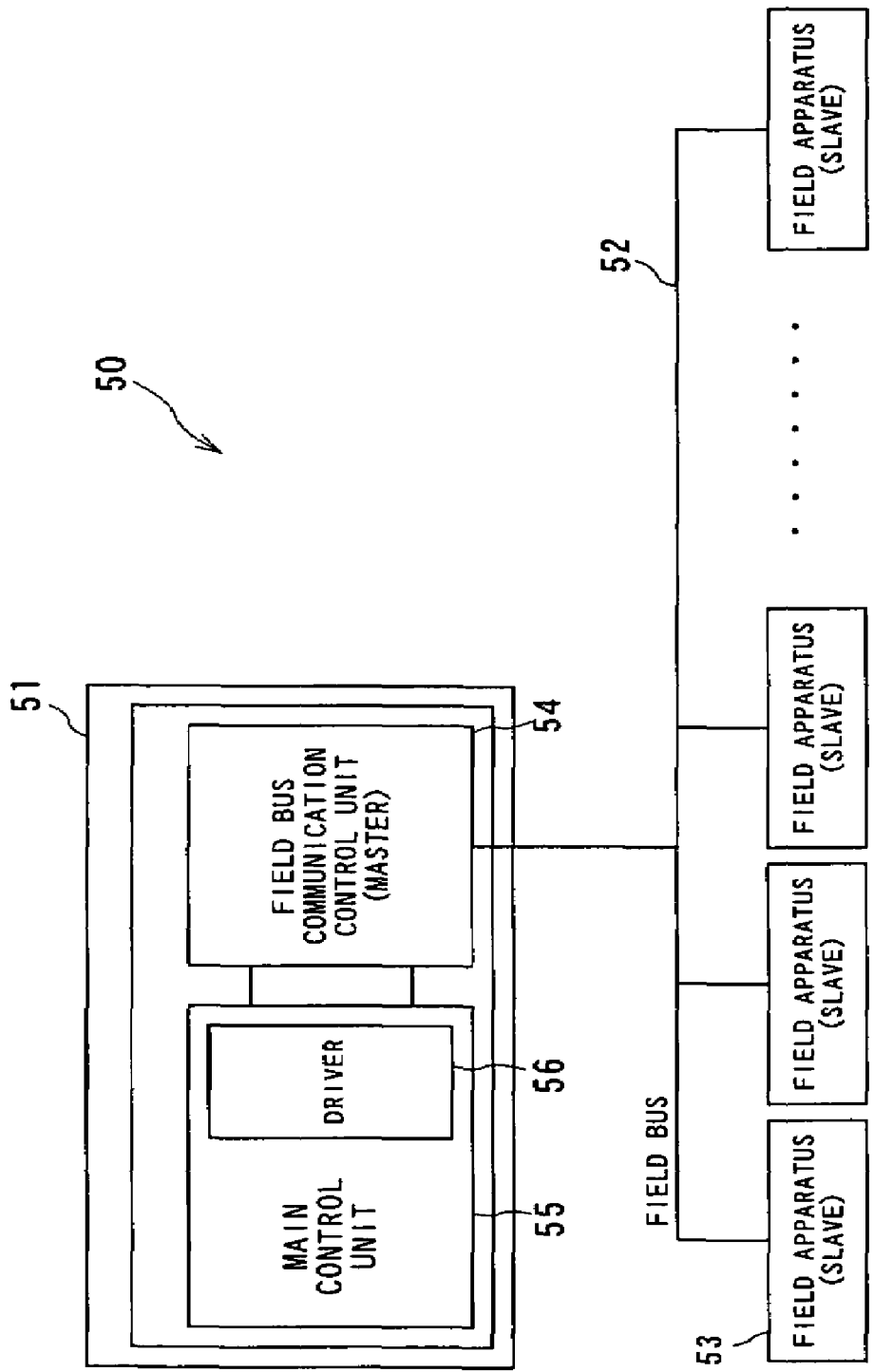
FIG. 10 is a block diagram depicting a general configuration of a conventional field apparatus control system.

For example, FIG. 9 shows a general configuration of the field apparatus control system 1D having a radio system field bus.

FIG. 9 shows an example when the duplicated I system field bus 34A and the II system field bus 34B in the field apparatus control system 1C in the fourth embodiment are implemented by radio transmissions 34A1 and 34B1 based on radio waves having different frequency bands (wave bands).

According to this modification, since the field buses (transmission paths) are constructed by radio transmission, it is unnecessary to lay cable for the field buses, failure of the field buses related to cable can be eliminated, making it possible to improve the reliability of the field apparatus control unit. In addition, because of radio transmission, the flexibility of the arrangement of the plurality of field apparatuses can be improved, making it possible to dramatically decrease the cable cost and the cost related to laying cables.

In particular, when this system is applied to a power plant, the field apparatuses tend to be influenced by high voltage surge due to the operation of plant apparatuses. The input portion of the field apparatus is normally insulated, but fails due to a short when a surge higher than the withstand voltage occurs. In this case, electric signals in the field apparatus leak into the field bus.

When such a status occurs, in a case where each communication control unit and the plurality of field apparatuses are connected via electric cables, failure of one field apparatus makes it impossible for the communication control unit to communicate with all the other field apparatuses.

Therefore, it is very effective to install an insulation means between the communication control unit and the field apparatus to minimize the influence of the above mentioned failure of a field apparatus.

In order to insulate between the communication control unit and the field apparatuses such that communication is possible, it may be considered to use a transmission system based on optical, in addition to a transmission system based on radio transmission described for this modification.

However, if an optical cable is used as the transmission path (transmission cable), cable handling is very complicated because a field apparatus is frequently installed near a plant apparatus. In addition, the communication control unit and the plurality of field apparatuses are connected by a so called "multi-drop system", so that the addition of a field apparatus requires to adjust an overall light level, which means the adjustment of the light level is very difficult for an optical transmission unit which has a small dynamic range.

In a case where the radio system of the present modification is used, on the other hand, data communication is possible without complicated procedures, including the above mentioned handling of the optical cable and the adjustment of the light level, so that it is possible to make free of the complicated procedures so as to further improve the practicality of this system.

Needless to say, the radio system field bus can be applied to field apparatus control systems of other embodiments as well.

While there has been described what is at present considered to be the preferred embodiments and modifications of the present invention. It will be understood that various modifications which are not described yet may be made therein, and it is intended to cover in the appended claims all such modifications as fall within the true spirit and scope of the invention.

What is claimed is:

1. A field apparatus control system for controlling a field apparatus connected to a field bus, comprising:
   first and second main control units configured to control the field apparatus; and
   first and second communication control units configured to process information communication between the first and second main control units, respectively and the field apparatus via the field bus,
   wherein the first main control unit and the first communication control unit are in a normal system mode or in a standby system mode, the second main control unit and the second communication control unit are in a normal system mode or in a standby system mode, and each of the first and second communication control units have a same address on a network via the field bus, and
   wherein information outputted to the same address from the field apparatus via the field bus is received and processed by both the first and second communication control units,
   wherein each of said first and second communication control units further comprises:
   means for transmitting an operation request to the field apparatus based on control information when the respective communication control unit is in the normal system mode, said control information being transmitted from the corresponding main control unit;
   means for receiving response information corresponding to the operation request transmitted from the field apparatus to the same address so as to transmit the received response information to the corresponding main control unit;
   first means for judging whether or not failure occurs to the respective communication control unit and corresponding main control unit;
   means for stopping operation of the respective communication control unit, when the first means for judging judges that failure occurs to the respective communication control unit and the respective communication control unit is in the normal system mode; and
   means for monitoring the operation of a communication control unit that is in the normal system mode when the respective communication control unit is in the standby system mode, detecting a stop of operation of the communication control unit that is in the normal system mode when the respective communication control unit is in the standby system mode, and switching the respective communication control unit and corresponding main control unit to the normal system mode when the respective communication control unit and the corresponding main control unit are in the standby system mode.

2. The field apparatus control system according to claim 1, wherein said field bus is configured by a radio system using radio waves in a high frequency band.

3. A field apparatus control system for controlling a field apparatus connected to a field bus, comprising:
   first and second main control units configured to control the field apparatus; and
   first and second communication control units configured to process information communication between the first and second main control units, respectively and the field apparatus via the field bus,
   wherein the first main control unit and the first communication control unit are in a normal system mode or in a standby system mode, the second main control unit and the second communication control unit are in a normal system mode or in a standby system mode, and each of the first and second communication control units have a same address on a network via the field bus, and
   wherein information outputted to the same address from the field apparatus via the field bus is received and processed by both the first and second communication control units,
   wherein said field bus connected to the field apparatus includes first and second field buses, and each of said communication control units further comprises:
   means for transmitting an operation request to the field apparatus via each of the first and second field buses based on control information when the respective communication control unit is in the normal system mode, said control information being transmitted from the corresponding main control unit;
   second means for judging whether or not response information corresponding to the operation request is transmitted from the field apparatus via the first field bus;
   first means for receiving the transmitted response information when the second means for judging judges that the response information is transmitted, and for transmitting the received response information to the corresponding main control unit;
   third means for judging whether or not response information corresponding to the operation request is transmitted from the field apparatus to the address via the second field bus when the second means for judging judges that the response information is not transmitted;
   second means for receiving the transmitted response information when the third means for judging judges that the response information is transmitted, and for transmitting the received response information to the corresponding main control unit;
   means for transmitting information to indicate the generation of failure in the first or second field buses to the corresponding main control unit when the third means for judging judges that the response information is not transmitted;

fourth means for judging whether or not failure occurs to the respective communication control unit or the corresponding main control unit;

means for stopping operation of the respective communication control unit when the respective communication control unit is in the normal system mode and the fourth means for judging judges that failure occurs to the respective communication control unit or the corresponding main control unit; and means for monitoring the operation of a communication control unit that is in the normal system mode when the respective communication control unit is in the standby system mode, detecting a stop of operation of the communication control unit that is in the normal system mode when the respective communication control unit is in the standby system mode, and switching the respective communication control unit and corresponding main control unit to the normal system mode when the respective communication control unit and the corresponding main control unit are in the standby system mode.

4. The field apparatus control system according to claim 3, wherein said duplicated first and second field buses are configured by radio transmissions based on radio waves which have different wavelength bands, respectively.

5. A field apparatus control system for controlling normal and standby field apparatuses, comprising:

normal and standby field buses connected to the normal and standby field apparatuses, respectively, wherein said normal field bus is isolated from said standby field apparatus and said standby field bus is isolated from said normal field apparatus;

first and second main control units configured to control the normal and standby field apparatuses; and first and second communication control units configured to process information communication between each of the main control units and the normal and standby field apparatuses via the normal and standby field buses, respectively, said first communication control unit further comprising, means for transmitting an operation request to the normal system field apparatus via the normal system field bus based on the control information which is transmitted from the first main control unit, means for receiving response information corresponding to the operation request which transmitted from the normal system field apparatus via the normal system field bus and for transmitting the received response information to the first main control unit, means for judging whether or not failure occurs to the first main control unit or the first communication control unit, and means for stopping operation of the first communication control unit when the means for judging judges that failure occurs to the first main control unit or the first communication control unit, and wherein said second communication control unit comprises means for monitoring operation of the first communication control unit so as to switch the second communication control unit which is in the standby system mode to the normal system mode when detecting a stop of the operation of first communication control unit according to the monitored result, wherein the first main control unit and the first communication control unit operate in a normal system mode, second main control unit and the second communication control unit operate in a standby system mode, and the first communication control unit is connected via the normal system field bus to the normal system field apparatus so that the first communication control unit executes information communication processing between the first main control unit and the normal system field apparatus via the normal system field bus, and wherein the second communication control unit is connected via the standby system field bus to the standby system field apparatus so that the second communication control unit executes information communication processing between the second main control unit and the standby system field apparatus via the standby system field bus.

6. A field apparatus control system for controlling a field apparatus, comprising:

duplicated first and second field buses connected to said field apparatus;

a main control unit configured to control said field apparatus; and a communication control unit configured to process information communication between the main control unit and the field apparatus via the first and second field buses, wherein said communication control unit further comprises means for transmitting an operation request to the field apparatus via the first and second field buses based on control information transmitted from the main control unit, first means for judging whether or not response information corresponding to the operation request is transmitted from the field apparatus via one of the first and second field buses, means for receiving the transmitted response information when the first judgment means for judging judges that the response information is transmitted so as to transmit and for transmitting the received response information to the main control unit, second judgment means for judging whether or not response information corresponding to the operation request is transmitted from the field apparatus via other of the first and second field buses when the first judgment means judges that the response information is transmitted, means for receiving the transmitted response information when the second judgment means judges that the response information is transmitted so as to transmit the received response information to the main control unit, and means for transmitting information to indicate the generation of failure in the first and second field buses to the main control unit when the second judgment means judges that the response information is not transmitted.

7. A computer readable storage medium storing computer executable instructions used in a field apparatus control system for controlling configured to control a field apparatus connected to a field bus, said field apparatus control system comprising duplicated normal and standby first and second main control units for controlling configured to control the field apparatus; and duplicated normal and standby first and second computers for processing information communication between the normal and standby first and second main control units and the field apparatus via the field bus, respectively, said computer readable storage medium being readable by at least one of the normal and standby first and second computers, said computer executable instructions stored on said computer readable storage medium configured to cause a computer to perform steps of:

causing at least one of the normal and standby first and second computers to transmit an operation request to the field apparatus based on control information when the own at least one computer is in a the normal computer mode, said control information being transmitted from the normal corresponding main control unit;

causing at least one of the normal and standby first and second computers to receive response information corresponding to the operation request transmitted from the field apparatus to an a same address, said same address being allocated to the normal and standby first and second computers;

causing at least one of the normal and standby first and second computers to transmit the received response information to the corresponding main control unit of an own system corresponding to the at least one of the normal and standby computers;

causing at least one of the normal and standby first and second computers to judge whether or not failure occurs to the own system corresponding main control unit or respective computer;

causing at least one of the normal and standby first and second computers to, when the own computer is the normal computer and it is judged that failure occurs to the own computer, stop the operation of the own computer when the respective computer is in the normal system mode and when the respective computer judges that failure occurs in the respective computer; and causing at least one of the normal and standby first and second computers to monitor operation of the a computer operating in a normal system mode computer when the own respective computer is in the standby computer system mode, and when, by the monitored result, detecting the stop of the operation of the normal computer, to switch the own computer which is the standby computer to the normal computer system mode when detecting the stop of the operation of the computer operating in the normal system mode based on the monitored result.

8. A field apparatus control system for controlling a field apparatus connected to a field bus, comprising:

first and second main control units configured to control the field apparatus; and first and second communication control units configured to process information communication between the first and second main control units, respectively, and the field apparatus via the field bus, wherein the first main control unit and the first communication control unit are in a normal system mode or in a standby system mode, the second main control unit and the second communication control unit are in a normal system mode or in a standby system mode, and each of the first and second communication control units have a same address on a network via the field bus, wherein information outputted to the address from the field apparatus via the field bus is transmitted to both the first and second communication control units, and wherein said field bus is configured by a radio system using radio waves in a high frequency band.

9. A field apparatus control system for controlling normal and standby field apparatuses, comprising:

normal and standby field buses connected to the normal and standby field apparatuses, respectively;

first and second main control units configured to control the normal and standby field apparatuses; and first and second communication control units configured to process information communication between each of the main control units and the normal and standby field apparatuses via the normal and standby field buses, respectively, wherein the first main control unit and the first communication control unit operate in a normal system mode, the second main control unit and the second communication control unit operate in a standby system mode, and the first communication control unit is connected via the normal system field bus to the normal system field apparatus so that the first communication control unit executes information communication processing between the first main control unit and the normal system field apparatus via the normal system field bus, wherein the second communication control unit is connected via the standby system field bus to the standby system field apparatus so that the second communication control unit executes information communication processing between the second main control unit and the standby system field apparatus via the standby system field bus, and wherein said normal and standby field buses are configured by a radio system using radio waves in a high frequency band.

10. A field apparatus control system for controlling a field apparatus connected to a field bus, comprising:

first and second main control units configured to control the field apparatus; and first and second communication control units configured to process information communication between the first and second main control units, respectively, and the field apparatus via the field bus, each of said first and second communication control units further comprising, means for transmitting an operation request to the field apparatus based on control information when the respective communication control unit is in the normal system mode, said control information being transmitted from the corresponding main control unit, means for receiving response information corresponding to the operation request transmitted from the field apparatus to the address so as to transmit the received response information to the corresponding main control unit, first means for judging whether or not failure occurs to the respective communication control unit and corresponding main control unit, means for stopping operation of the respective communication control unit, when the means for judging judges that failure occurs to the respective communication control unit and the respective communication control unit is in the normal system mode, and means for monitoring the operation of a communication control unit that is in the normal system mode when the respective communication control unit is in the standby system mode, detecting a stop of operation of the communication control unit that is in the normal system mode when the respective communication control unit is in the standby system mode, and switching the respective communication control unit and corresponding main control unit to the normal system mode when the respective communication control unit and the corresponding main control unit are in the standby system mode, wherein the first main control unit and the first communication control unit are in a normal system mode or in a standby system mode, the second main control unit and the second communication control unit are in a normal system mode or in a standby system mode, and each of the first and second communication control units have a same address on a network via the field bus, and wherein information outputted to the same address from the field apparatus via the field bus is received by both the first and second communication control units.

* * * * *